US010466544B2

(12) United States Patent
Lee et al.

(10) Patent No.: US 10,466,544 B2
(45) Date of Patent: Nov. 5, 2019

(54) ROLL-TO-ROLL METHOD FOR MANUFACTURING A 2D/3D GRATING SWITCH MEMBRANE

(71) Applicant: Ningbo Marvel Display Technology Co., Ltd., Ningbo (CN)

(72) Inventors: Herbert Ying Chiu Lee, Ningbo (CN); Kaiyu Gu, Ningbo (CN); Huabo Wang, Ningbo (CN); Chunguang Zhang, Ningbo (CN)

(73) Assignee: Ningbo Marvel Display Technology Co., Ltd. (CN)

( * ) Notice: Subject to any disclaimer, the term of this patent is extended or adjusted under 35 U.S.C. 154(b) by 262 days.

(21) Appl. No.: 15/364,492

(22) Filed: Nov. 30, 2016

(65) Prior Publication Data

US 2017/0285411 A1 Oct. 5, 2017

(30) Foreign Application Priority Data

Mar. 29, 2016 (CN) .......................... 2016 1 0187507

(51) Int. Cl.
 *G02F 1/1337* (2006.01)
 *G02F 1/29* (2006.01)
 (Continued)

(52) U.S. Cl.
 CPC .... *G02F 1/133784* (2013.01); *B29D 11/0073* (2013.01); *B29D 11/00644* (2013.01); *B29D 11/00788* (2013.01); *B32B 3/30* (2013.01); *B32B 7/04* (2013.01); *B32B 27/06* (2013.01); *B32B 27/16* (2013.01); *B32B 27/281* (2013.01); *B32B 37/0053* (2013.01); *B32B 37/15* (2013.01); *B32B 38/0012* (2013.01); *G02F 1/1303* (2013.01); *G02F 1/292* (2013.01); *B29K 2679/08* (2013.01); *B29K 2905/00* (2013.01); *B29K 2995/0034* (2013.01); *B32B 2038/0016* (2013.01); *B32B 2250/02* (2013.01);
 (Continued)

(58) Field of Classification Search
 None
 See application file for complete search history.

(56) References Cited

U.S. PATENT DOCUMENTS

| 7,282,108 B2 * | 10/2007 | Mansson | ................... B31F 1/07 156/209 |
| 2007/0052892 A1 * | 3/2007 | Tanaka | .............. G02F 1/133784 349/124 |

FOREIGN PATENT DOCUMENTS

CN 102096229 6/2011

* cited by examiner

*Primary Examiner* — Barbara J Musser
(74) *Attorney, Agent, or Firm* — Price Heneveld LLP (57) ABSTRACT

A roll-to-roll method for manufacturing 2D/3D grating switch membrane is performed in such a way that: Step 1 and Step 2 are simultaneously performed, then Step 3 is performed, and finally Step 4 is performed: Step 1, subjecting a concave grating facing down to rubbing and liquid crystal dropping; Step 2, uniformly coating a PI liquid onto a surface layer of a mirror-face metal roller, and performing self-hating and rubbing; Step 3, making the concave grating rubbed and dropped with liquid crystals in Step 1 and PI layer coated and directionally-rubbed on the mirror-face metal roller in Step 2 attached to each other, forming a grating membrane, and rotating and pre-baking the grating membrane with the mirror-face metal roller; Step 4, curing the attached and baked grating membrane by the UV curing means and after stripping, collecting and winding through the 2D/3D grating switch membrane collecting roller.

13 Claims, 5 Drawing Sheets

(51) Int. Cl.
*G02F 1/13* (2006.01)
*B32B 37/15* (2006.01)
*B32B 3/30* (2006.01)
*G02F 1/1341* (2006.01)
*B29D 11/00* (2006.01)
*B32B 7/04* (2019.01)
*B32B 27/28* (2006.01)
*B32B 27/06* (2006.01)
*B32B 37/00* (2006.01)
*B32B 38/00* (2006.01)
*B32B 27/16* (2006.01)
*B29K 679/00* (2006.01)

(52) U.S. Cl.
CPC ..... *B32B 2307/418* (2013.01); *B32B 2307/42* (2013.01); *B32B 2310/0831* (2013.01); *B32B 2379/08* (2013.01); *B32B 2457/20* (2013.01); *G02F 1/133723* (2013.01); *G02F 2001/13415* (2013.01)

ROLL-TO-ROLL METHOD FOR MANUFACTURING A 2D/3D GRATING SWITCH MEMBRANE

TECHNICAL FIELD

The present invention relates to the technical field of 3D display.

BACKGROUND ART

Development of glasses-free 3D, which objectively shakes off the restriction that only with the aid of accessory equipment such as stereo glasses can 3D effect be viewed, improves viewing comfort, broadens application fields, also does much good on people's life and work, and is highly concerned.

A columnar lens grating splits light mainly by using the light refraction principle. Many tiny columnar lens individuals are arranged along a radial direction to form a columnar lens grating array, referred to as a columnar lens grating for short. Such columnar lens grating has been widely applied as one type of stereoscopic display technology.

The conventional stereoscopic display of the type of columnar lens grating array cannot realize a 2D/3D switch, and viewers often feel that characters and images and so on without 3D effect are blurred, and the display effect is not as good as the 2D display effect.

A grating 2D/3D switching device is disclosed in the prior art: a Chinese patent "2D/3D Switching Type Stereoscopic Display and Control Method thereof," published on Jun. 15, 2011, with the publication No. CN102096229A, has a structure comprising a 2D display, a TN box, and a 2D/3D grating switch membrane. The 2D display is used to provide an image having a polarization direction. The TN box is used to rotate the polarization direction of the image by switching on/off the power, so as to make the 2D/3D switching type stereoscopic display switch between a 2D display state and a 3D display state. By filling solid liquid crystals in the 2D/3D grating switch membrane, the birefringence of the solid liquid crystals matches the refractive index of a solid polymer, and for positive liquid crystals, the refractive index of the solid polymer matches a short-shaft refractive index of the liquid crystals to realize refraction and perpendicular incidence of light.

Currently, manufacture of the 2D/3D grating switch membrane should undergo procedures such as directional rubbing (twice), liquid crystal filling, attaching, baking, curing and so on. Each procedure is independently completed, and continuous manufacture cannot be accomplished in the prior art. Each procedure generally is manually completed, with low manufacturing efficiency and serious wastes.

Therefore, there is an urgent need for a highly effectively roll-to-roll technological method for manufacturing a 2D/3D membrane capable of realizing continuous production and ensuring accuracy.

DISCLOSURE OF THE INVENTION

An object of the present invention is to provide a roll-to-roll method for manufacturing a 2D/3D grating switch membrane, to solve problems that currently it is hard to continuously manufacture the 2D/3D switch membrane, the material is seriously wasted, and the efficiency is low.

The roll-to-roll method for manufacturing the 2D/3D grating switch membrane of the present invention uses a manufacturing device that comprises a concave grating feeding reel, a concave grating rubbing drum, a first roller, a liquid crystal dropping means, a PI rubbing means, a mirror-face metal roller, a second roller, a polyimide (PI) liquid dropping means, a PI liquid leveling roller, a UV curing means and a 2D/3D grating switch membrane collecting roller; wherein the first roller is tangent to the mirror-face metal roller and located obliquely below the mirror-face metal roller, with a gap of d therebetween, and the second roller is tangent to the mirror-face metal roller and located obliquely above the mirror-face metal roller; the rubbing drum is tangent to the first roller and located directly below the first roller; the PI liquid leveling roller is tangent to the second roller and located lateral to the second roller, the PI rubbing means is tangent to the mirror-face metal roller and located lateral to the mirror-face metal roller; the concave grating feeding reel, the concave grating rubbing drum, the mirror-face metal roller and the PI liquid leveling roller have a same rotating direction; the first roller, the PI rubbing means and the second roller have a same rotating direction; and the first roller and the mirror-face metal roller have opposite rotating directions; the method is performed in such a way that Step 1 and Step 2 are simultaneously carried out, then Step 3 is carried out, and finally Step 4 is carried out:

Step 1: transmitting a concave grating from right to left by the concave grating feeding reel, with the concave grating facing down, rubbing by the concave grating rubbing drum, performing liquid crystal dropping on the rubbed concave grating according to a surface width through the liquid crystal dropping means located above the first roller, and allowing the concave grating to rotate along with the first roller to a place where the first roller is tangent to the mirror-face metal roller;

Step 2: dropping a PI liquid onto a surface of the second roller by the PI liquid dropping means, and leveling the PI liquid on the surface of the second roller to be uniform by the PI liquid leveling roller and then spin-coating onto a surface layer of the mirror-face metal roller; wherein the mirror-face metal roller coated with the PI liquid on the surface layer is rotated, the PI liquid on the surface layer, after being leveled, is baked and cured through self-heating, and a cured PI layer is rubbed at 90° by the PI rubbing means, with a rubbing direction being consistent with a rubbing direction of a surface of the concave grating;

Step 3: making the rubbed concave grating where liquid crystals dropped in Step 1 and the PI layer coated and directionally rubbed on the mirror-face metal roller in Step 2 attached to each other to form a grating membrane, and allowing the grating membrane to rotate along with the mirror-face metal roller, and be pre-baked by the attachment between the mirror-face metal roller and the first roller below the mirror-face metal roller;

Step 4: curing the attached and baked grating membrane by the UV curing means and after stripping, collecting and winding through the 2D/3D grating switch membrane collecting roller.

The manufacturing device further comprises a stripping means, a first ion air knife means, a second ion air knife means and an air suction hood. The stripping means comprises a stripping mechanism configured to strip the cured and shaped 2D/3D grating switch membrane from the mirror-face metal roller and a third ion air knife means configured to remove static electricity generated when the 2D/3D grating switch membrane is stripped and liquid crystal powder and dust remaining on the mirror-face metal roller during the stripping.

Further, in Step 1, after the concave grating is rubbed by the concave grating rubbing drum, static electricity and dust on the surface are removed by a charged ion airflow generated by the first ion air knife means further, and electric ion air and dust are sucked by the suction hood.

Further, in Step 2, the PI layer, after being rubbed by the PI rubbing means, is subjected to destaticizing and dedusting treatment through the second air knife means.

Besides, the present invention further provides another roll-to-roll method for manufacturing a 2D/3D grating switch membrane, wherein the method uses a manufacturing device that comprises a concave grating feeding reel, a concave grating rubbing drum, a first roller, a liquid crystal dropping means, a PI rubbing means, a mirror-face metal roller, a second roller, a PI liquid dropping means, a PI liquid leveling roller, a UV curing means and a 2D/3D grating switch membrane collecting roller; the first roller is tangent to the mirror-face metal roller and located obliquely above the mirror-face metal roller, with a gap of d therebetween, the second roller is tangent to the mirror-face metal roller and located at right side of the mirror-face metal roller; the rubbing drum is tangent to the first roller and located directly above the first roller, with a compression amount D1 of flannelette; the PI liquid leveling roller is tangent to the second roller and located lateral to the second roller; the PI rubbing means is tangent to the mirror-face metal roller and located directly above the mirror-face metal roller, with a compression amount D2 of flannelette; the concave grating feeding reel, the first roller, the PI rubbing means, the second roller, and the 2D/3D grating switch membrane collecting roller have the same rotating direction; the rubbing drum, the mirror-face metal roller, and the PI liquid leveling roller have the same rotating direction; and the first roller and the mirror-face metal roller have opposite rotating directions; the method is performed in such a way that: Step 1 and Step 2 are simultaneously carried out, then Step 3 is carried out, and finally Step 4 is carried out, Step 1: transmitting a concave grating bottom up by the concave grating feeding reel, with the concave grating facing to the left, rubbing by the concave grating rubbing drum, performing liquid crystal dropping on the rubbed concave grating according to a surface width through the liquid crystal dropping means located at the upper left of the mirror-face metal roller, and allowing the concave grating to rotate along with the first roller to a place where the first roller is tangent to the mirror-face metal roller;

Step 2: dropping a PI liquid onto a surface of the second roller by the PI liquid dropping means, and leveling the PI liquid on the surface of the second roller to be uniform by the PI liquid leveling roller and then spin-coating onto a surface layer of the mirror-face metal roller; wherein the mirror-face metal roller coated with the PI liquid on the surface layer is rotated, the PI liquid on the surface layer, after being leveled, is baked and cured, and a cured PI layer is rubbed at 90° by the PI rubbing means, with a rubbing direction being consistent with a rubbing direction of a surface of the concave grating;

Step 3: making the rubbed concave grating where liquid crystals dropped in Step 1 and the PI layer coated and directionally rubbed on the mirror-face metal roller in Step 2 attached to each other to form a grating membrane, and allowing the grating membrane to rotate along with the mirror-face metal roller, and be pre-baked by the attachment between the mirror-face metal roller and the first roller below the mirror-face metal roller;

Step 4: curing the attached and baked grating membrane by the UV curing means and after stripping, collecting and winding through the 2D/3D grating switch membrane collecting roller.

Further, the manufacturing device further comprises a first infrared heating means and a second infrared heating means.

The advantages of the present invention are as follows: it is easy to control the clean environment for manufacture of the 2D/3D grating switch membrane manufactured by the method of the present invention; grooves of the concave grating are filled up with liquid crystals and the concave grating will not be crushed, enabling good quality; sufficient time required by alignment of the liquid crystals is ensured, enabling high success rate; and after the cured 2D/3D grating switch membrane is stripped from the mirror-face metal roller, no debris is left on the surface of the mirror-face metal roller, providing a favorable condition for continuous manufacture of the mirror-face metal roller.

DETAILED DESCRIPTION OF EMBODIMENTS

Figure 1:
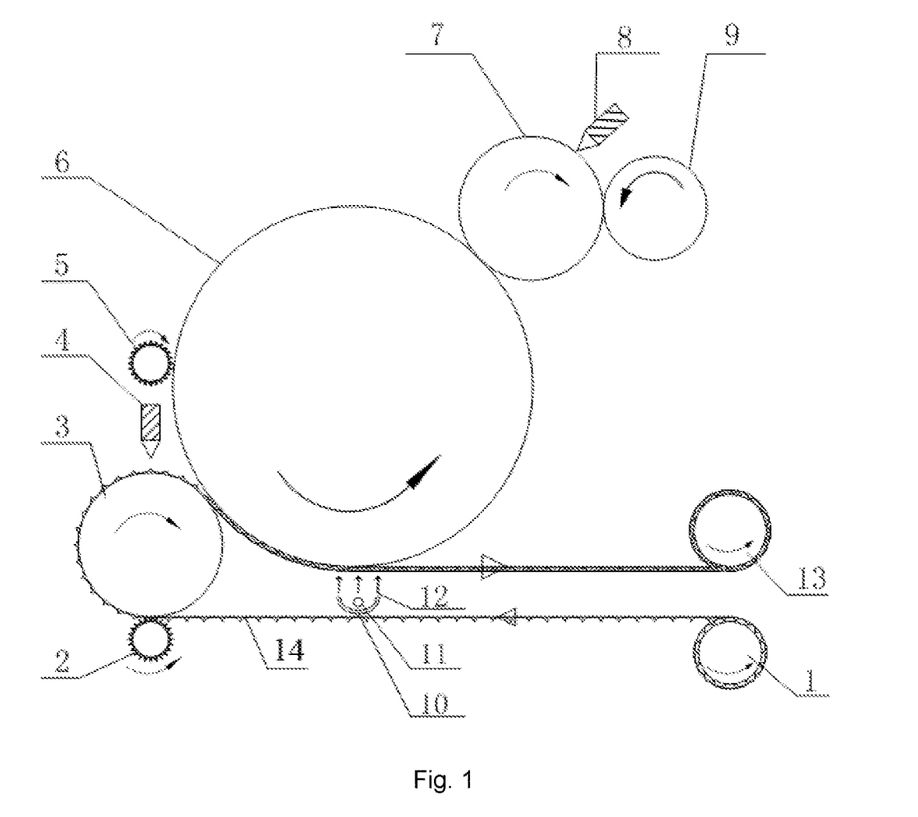
FIG. 1 is a schematic diagram showing a roll-to-roll method for manufacturing a 2D/3D grating switch membrane of the present invention.
Figure 2:
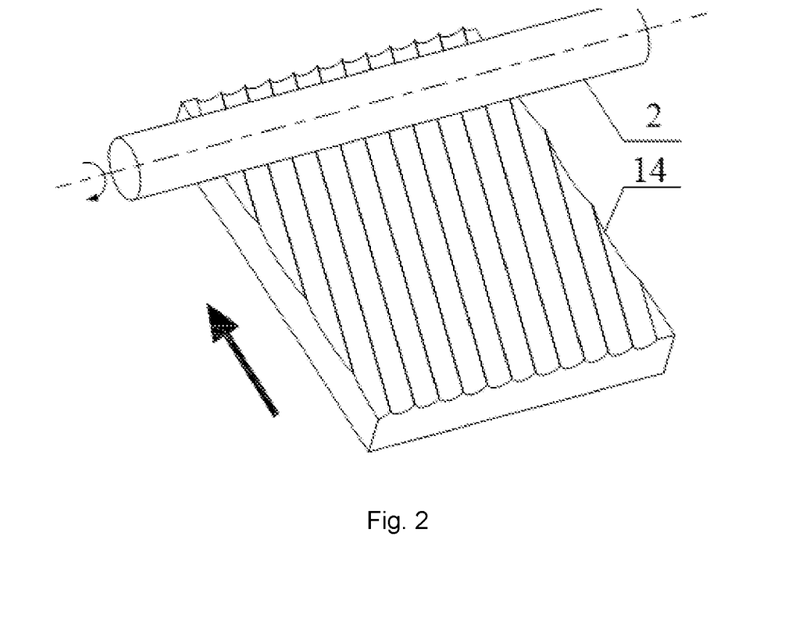
FIG. 2 is a schematic diagram showing rubbing between a concave grating and a concave grating rubbing drum, wherein the concave grating has a certain angle.

Embodiment 1: below the embodiment is illustrated in conjunction with FIG. 1 and FIG. 2. The embodiment provides a roll-to-roll method for manufacturing a 2D/3D grating switch membrane, wherein the method uses a manufacturing device that comprises a concave grating feeding reel 1, a concave grating rubbing drum 2, a first roller 3, a liquid crystal dropping means 4, a PI rubbing means 5, a mirror-face metal roller 6, a second roller 7, a PI liquid dropping means 8, a PI liquid leveling roller 9, a UV curing means and a 2D/3D grating switch membrane collecting roller 13; the first roller 3 is tangent to the mirror-face metal roller 6 obliquely from below, with a gap of d therebetween, and the second roller 7 is tangent to the mirror-face metal roller 6 and located obliquely above the mirror-face metal roller; the rubbing drum 2 is tangent to the first roller 3 and located directly below the first roller; the PI liquid leveling roller 9 is tangent to the second roller 7 and located lateral to the second roller, the PI rubbing means 5 is tangent to the mirror-face metal roller 6 and located lateral to the mirror-face metal roller; the concave grating feeding reel 1, the concave grating rubbing drum 2, the mirror-face metal roller 6 and the PI liquid leveling roller 9 have a same rotating direction; the first roller 3, the PI rubbing means 5 and the second roller 7 have a same rotating direction; and the first roller 3 and the mirror-face metal roller 6 have opposite rotating directions; the method is performed in such a way that: Step 1 and Step 2 are simultaneously carried out, then Step 3 is carried out, and finally Step 4 is carried out, Step 1: transmitting a concave grating 14 from right to left by the concave grating feeding reel 1, with the concave grating 14 facing down, rubbing the concave grating by the concave grating rubbing drum 2, performing liquid crystal dropping on the rubbed concave grating 14 according to a surface width through the liquid crystal dropping means 4 located above the first roller 3, and allowing the concave grating to rotate along with the first roller 3 to a place where the first roller is tangent to the mirror-face metal roller 6;

Step 2: dropping a PI liquid onto a surface of the second roller 7 by the PI liquid dropping means 8, and leveling the PI liquid on the surface of the second roller 7 to be uniform by the PI liquid leveling roller 9 and then spin-coating onto a surface layer of the mirror-face metal roller 6; wherein the mirror-face metal roller 6 coated with the PI liquid on the surface layer is rotated, the PI liquid on the surface layer, after being leveled, is baked and cured through self-heating, and a cured PI layer is rubbed at 90° by the PI rubbing means 5, with a rubbing direction being consistent with the rubbing direction of the surface of the concave grating 14;

Step 3: making the rubbed concave grating 14 where liquid crystals dropped in Step 1 and the PI layer coated and directionally rubbed on the mirror-face metal roller 6 in Step 2 attached to each other to form a grating membrane, and allowing the grating membrane to rotate along with the mirror-face metal roller 6, and be pre-baked by the attachment between the mirror-face metal roller and the first roller 3 below the mirror-face metal roller 6;

Step 4: curing the attached and baked grating membrane by the UV curing means and after stripping, collecting and winding through the 2D/3D grating switch membrane collecting roller 13.

Figure 3:
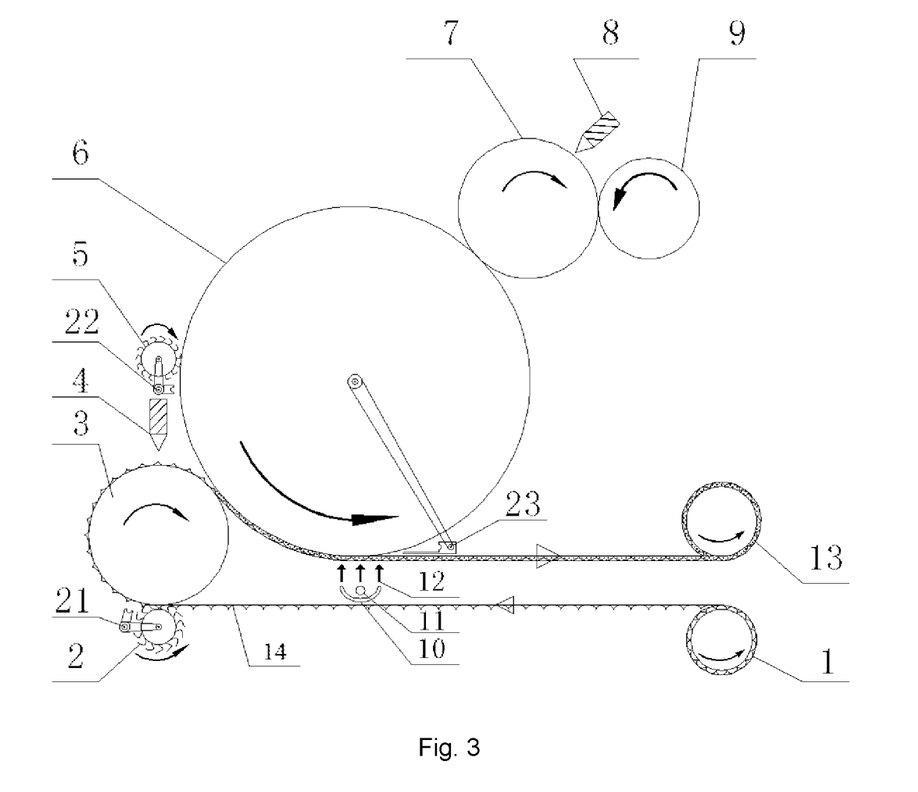
FIG. 3 is another schematic diagram showing the roll-to-roll method for manufacturing a 2D/3D grating switch membrane of the present invention.

As shown in FIG. 3, the manufacturing device further comprises a stripping means 23, a first ion air knife means 21, a second ion air knife means 22 and a suction hood. The stripping means 23 comprises a stripping mechanism configured to strip the cured and shaped 2D/3D grating switch membrane from the mirror-face metal roller and a third ion air knife means configured to remove static electricity generated when the 2D/3D grating switch membrane is stripped and liquid crystal powder and dust remaining on the mirror-face metal roller during the stripping.

Further, in Step 1, after the concave grating 14 is rubbed by the concave grating rubbing drum 2, the static electricity and dust on the surface are removed by a charged ion airflow generated by the first ion air knife means 21 further, and electric ion air and dust are sucked by the suction hood.

Further, in Step 2, the PI layer, after being rubbed by the PI rubbing means, is subjected to destaticizing and dedusting treatment through the second air knife means 22.

The UV curing means comprises a precision light reflecting cover 10, a high-power UV curing lamp 11 and a light collimating optical system 12, wherein the high-power UV curing lamp 11 is located below the mirror-face metal roller 6, the light collimating optical system 12 is located between the mirror-face metal roller 6 and the high-power curing lamp 11, and the precision light reflecting cover 10 is located outside the high-power UV curing lamp 11. The UV curing energy required by a birefringent liquid crystal material can be calculated according to the following formula:

$$E = E_0 \frac{L}{r_3 \omega_3}$$

where E represents UV curing energy of the liquid crystals in a unit area; $E_0$ represents radiation energy of the UV curing lamp in a unit area; L represents a radiation width of a UV lamp tube along a rotation direction of the mirror-face metal roller; $\omega_3$ represents an angular velocity of rotation of the mirror-face metal roller 6; $r_3$ represents a radius of the mirror-face metal roller.

The gap d between the first roller 3 and the mirror-face metal roller 6 is greater than or equal to overall thickness of the concave grating 14 and can ensure that grooves of the concave grating are filled up with the liquid crystals and also the concave grating is not crushed.

The concave grating feeding reel 1 performs feeding by anticlockwise rotating a coiled tiny lens concave grating array having a certain angle and a fixed reflectivity, with the concave grating facing downward.

A lower side of the first roller 3 below the mirror-face metal roller 6 and the concave grating rubbing drum 2 are rubbed at 90°, and the rubbing is preferably performed for 2-3 times; and an upper side is repeatedly dropped with the liquid crystals through the liquid crystal dropping means 4.

The concave grating rubbing drum 2 comprises a roller drum, a rubbing flannelette and special double-sided glue. A rotating speed of the roller drum of the rubbing drum is controllable, and a compression amount of the rubbing flannelette also can be adjusted for orientation of a surface of the concave grating.

The concave grating rubbing drum 2 rubs the concave grating wound on the surface of the first roller 3, and the rubbing strength can be calculated according to the following formula:

$$N'_d = M' \times D' \left( \frac{r_2 \omega_2 - r_1 \omega_1}{r_1 \omega_1} \right)$$

where $N'_d$ represents the rubbing strength of the roller drum of the rubbing drum 2; M' represents number of rubbing times; D' represents the compression amount of the flannelette; $\omega_2$ represents an angular velocity of rotation of the roller drum of the rubbing drum 2; $r_2$ represents a radius of the roller drum of the rubbing drum 2; w represents an angular velocity of rotation of the first roller 3; $r_1$ represents a radius of the roller drum of the first roller, and $r_2 < r_1$ and $\omega_2 > \omega 1$ are satisfied.

The cured PI layer is subjected to directional rubbing through the PI rubbing means 5, and the rubbing strength can be calculated according to the following formula:

$$N_d = M \times D \left( \frac{r_4 \omega_4 - r_3 \omega_3}{r_3 \omega_3} \right)$$

where $N_d$ represents the rubbing strength of the PI rubbing means 5; M represents number of rubbing times; D represents the compression amount of the flannelette; $\omega_4$ represents an angular velocity of rotation of the PI rubbing means 5; $r_4$ represents a radius of the roller drum of the PI rubbing means 5; $\omega_3$ represents an angular velocity of rotation of the mirror-face metal roller 6; $r_3$ represents a radius of the mirror-face metal roller, and $r_4 < r_3$ and $\omega_4 > \omega_3$ are satisfied.

Main shafts of the first ion air knife means 21 and the second ion air knife means 22 are respectively connected with main shafts of the concave grating rubbing drum 2 and the PI rubbing means 5. The first ion air knife means and the second ion air knife means generate high-speed charged ion airflow, and the blowing effect of the charged ion airflow on the product surface can remove the static electricity on the product surface, meanwhile, the blown dust, nap and electric ion air are sucked by the suction hood (not shown in the figure), satisfying the clean quality and environment requirements of the product manufacture.

The liquid crystal dropping means 4: the liquid crystal dropping means 4 is driven by a screw rod, and a surface liquid crystal dropping width is adjusted by an infrared sensor (not marked in the figure). The solid liquid crystal is baked and molten into a molten state, and the surface of the concave grating 14 is subjected to liquid crystal dropping in a range of the infrared sensor under an air pressure by a liquid crystal heat-preservation storage tank, a fluid tube and a fluid needle cylinder. The heat-preservation storage tank, the fluid tube and the fluid needle cylinder can be externally wound with a heating resistance wire to ensure the temperature required by the molten viscous state of the liquid crystals. The controlled temperature range of the liquid crystals is between a melting point and a clearing point of the solid liquid crystals when molten, so that the liquid crystals in the molten state can easily flow in the fluid needle cylinder. The liquid crystal dropping means 4 also can use other coating manners, for example, a slit coating manner.

The mirror-face metal roller 6 is tangent to the second roller 7, and has a gap with the first roller 3. The rotating direction of the mirror-face metal roller 6 is opposite to those of the two rollers. Such mirror-face metal roller can be heated internally, so that when the PI liquid is coated on the second roller 7, the PI liquid moves along the track range from the location where the coating starts to the location of the PI rubbing means 5, to be sufficiently baked and dried through self-heating inside the mirror-face metal roller.

The self-heating temperature of the mirror-face metal roller 6 is lower than a temperature range that the concave grating can withstand.

The self-heating temperature of the mirror-face metal roller 6 is higher than a range of baking temperature of the PI liquid.

The mirror-face metal roller also can be heated by an external heating device, for example, infrared heating device and so on.

The PI liquid on the second roller 7 is coated onto the mirror-face metal roller 6. When the PI liquid dropping means repeatedly drops the PI liquid on the second roller 7 in a width range, the PI liquid on the surface of the second roller 7 is also leveled through the PI liquid leveler 9, so that the PI liquid on the second roller 7 is uniformly coated on the surface layer of the mirror-face metal roller 6.

The PI liquid is a low-temperature PI liquid.

The PI coating device also can use other precision coating manners, for example, slit coating manner and so on.

On the mirror-face metal roller 6, the PI layer which is uniformly coated and completely baked is rubbed at 90° by the roller drum of the PI rubbing means 5, and the rubbing is generally performed for 1~2 times, so as to obtain a single layer of aligned liquid crystal.

The gap between the first roller 3 and the mirror-face metal roller 6 can be adjusted, for performing attaching of the concave grating dropped with the liquid crystals on the first roller 3 and the PI layer on the mirror-face metal roller 6 and pre-baking.

The attached and pre-baked 2D/3D grating switch membrane on the mirror-face metal roller 6, after being UV-cured, is stripped by the stripping means 23. A main shaft of the stripping means 23 is connected with a main shaft of the mirror-face metal roller 6, facilitating adjustment of the gap between the stripping mechanism and the mirror-face metal roller 6. Meanwhile, the stripping means comprises a third ion air knife means (not shown in the figures), for removing static electricity generated during the stripping, dust brought by the stripping and liquid crystal power generated by cleaning of the stripping mechanism, facilitating continuous operation of the mirror-face metal roller 6.

The 2D/3D grating switch membrane collecting roller 13 is used to wind and collect the grating membrane with aligned solid liquid crystal.

Embodiment 2

Figure 4:
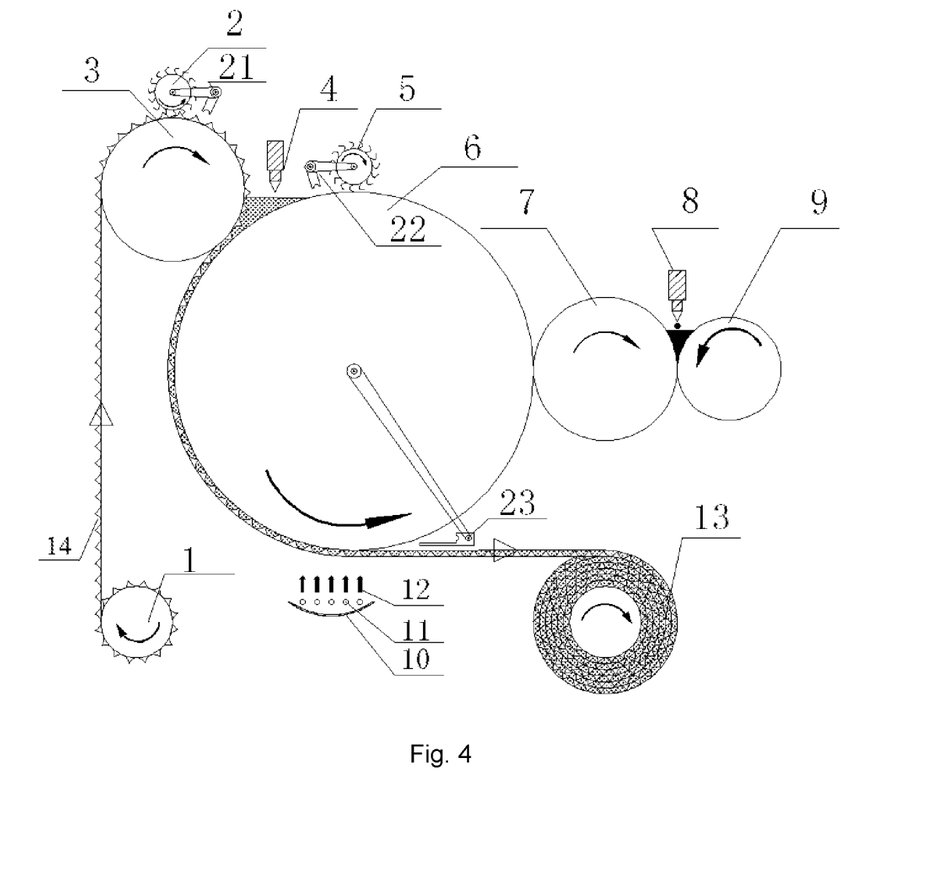
FIG. 4 is another schematic diagram showing the roll-to-roll method for manufacturing a 2D/3D grating switch membrane of the present invention.

As shown in FIG. 4, the present embodiment is different from embodiment 1 in that, the first roller 3 is entirely moved upward, and is tangent to the mirror-face metal roller 6 and located obliquely above the mirror-face metal roller, with a gap of d therebetween, and the second roller 7 is tangent to the mirror-face metal roller 6 and located at the right side of the mirror-face metal roller; the rubbing drum 2 is tangent to the first roller 3 and located directly above the first roller, with a compression amount D1 of flannelette; the PI liquid leveling roller 9 is tangent to the second roller 7 and located lateral to the second roller; the PI rubbing means 5 is tangent to the mirror-face metal roller 6 and located directly above the mirror-face metal roller, with a compression amount D2 of flannelette; the concave grating feeding reel 1, the first roller 3, the PI rubbing means 5, the second roller 7 and the 2D/3D grating switch membrane collecting roller 13 have a same rotating direction; the rubbing drum 2, the mirror-face metal roller 6 and the PI liquid leveling roller have a same rotating direction; and the first roller 3 and the mirror-face metal roller have opposite rotating directions.

The prominent advantages of the present embodiment are as follows: providing sufficient time required by alignment of the liquid crystals after coating, being beneficial to manufacturing a 2D/3D grating switch membrane with good 3D quality and excellent 2D effect, and having a high success rate.

Embodiment 3

Figure 5:
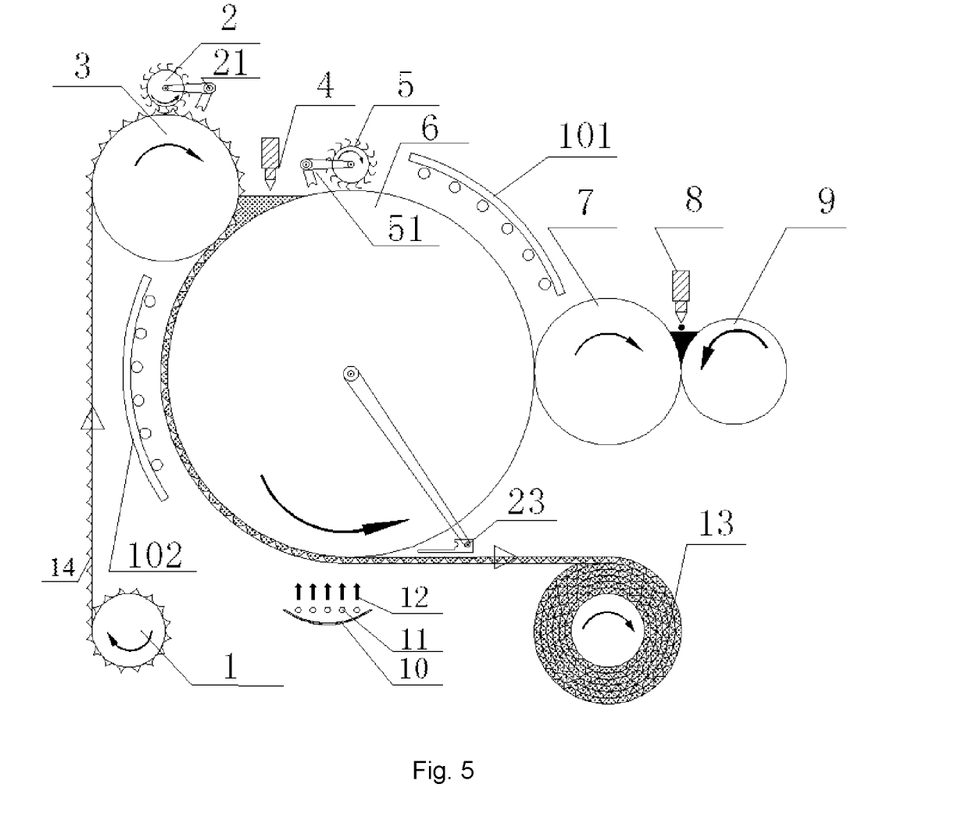
FIG. 5 is another schematic diagram showing the roll-to-roll method for manufacturing a 2D/3D grating switch membrane of the present invention.

As shown in FIG. 5, the present embodiment is different from embodiment 2 in that, a first infrared heating means 101 and a second infrared heating means 102 are added; the first infrared heating means and the second infrared heating means both comprise infrared halogen heating tubes and a light reflecting cover. The mirror-face metal roller 6 is not heated internally, but through external conduction. The first infrared heating means 101 bakes and cures the PI liquid coated on the mirror-face metal roller 6 through rotation of the second roller 7 from the upper right; and the second infrared heating means 102 aligns the coated liquid crystals from the lower left, after the alignment is completed, pre-cooling is performed, and then curing is performed by a UV curing machine, and stripping is carried out.

The prominent characteristics of the present embodiment are as follows: the infrared heating means can provide temperatures required by different materials (PI, liquid crystal), and have less restrictions to the materials; the infrared heating means can raise the temperature quickly, have strong penetrating power, and improve the efficiency of roll-to-roll manufacture; the liquid crystals, after being aligned by the second infrared heating means 102, can be effectively cooled and then cured, facilitating effective matching of refracting index.

A roll-to-roll method for continuously manufacturing a 2D/3D grating switch membrane is exemplarily described in the present invention, and any modifications, improvements and the like on the method, without departing from the spirit and principle of the present invention, fall within the scope of protection of the present invention.

The invention claimed is:

1. A roll-to-roll method for manufacturing a 2D/3D grating switch membrane, wherein the method uses a manufacturing device that comprises a concave grating feeding reel, a concave grating rubbing drum, a first roller, a liquid crystal dropping means, a polyimide (PI) rubbing means, a mirror-face metal roller, a second roller, a PI liquid dropping means, a polyimide PI liquid leveling roller, a UV curing means and a 2D/3D grating switch membrane collecting roller; wherein the first roller is tangent to the mirror-face metal roller and located obliquely below the mirror-face metal roller, with a gap of d therebetween, the second roller is tangent to the mirror-face metal roller and located obliquely above the mirror-face metal roller; the rubbing drum is tangent to the first roller and located directly below the first roller; the PI liquid leveling roller is tangent to the second roller and located lateral to the second roller, the PI rubbing means is tangent to the mirror-face metal roller and located lateral to the mirror-face metal roller; the concave grating feeding reel, the concave grating rubbing drum, the mirror-face metal roller and the PI liquid leveling roller have a common rotating direction; the first roller, the PI rubbing means and the second roller have a common rotating direction; and the first roller and the mirror-face metal roller have opposite rotating directions;

the method comprising the steps of:
(a) transmitting a concave grating from right to left by the concave grating feeding reel, with the concave grating facing down, rubbing with the concave grating rubbing drum, performing liquid crystal dropping on the rubbed concave grating according to a surface width through the liquid crystal dropping means located above the first roller, and allowing the concave grating to rotate along with the first roller to a place where the first roller is tangent to the mirror-face metal roller;
(b) simultaneous with step (a), dropping a PI liquid onto a surface of the second roller by the PI liquid dropping means, and leveling the PI liquid on the surface of the second roller to be uniform by the PI liquid leveling roller, and then spin-coating onto a surface layer of the mirror-face metal roller,
wherein the mirror-face metal roller coated with the PI liquid on the surface layer is rotated, the PI liquid on the surface layer, after being leveled, is baked and cured through self-heating, and a cured PI layer is rubbed at 90° by the PI rubbing means, with a rubbing direction being consistent with a rubbing direction of a surface of the concave grating;
(c) after steps (a) and (b), making the rubbed concave grating where liquid crystals dropped in step (a) and the PI layer coated and directionally rubbed on the mirror-face metal roller in step (b) attached to each other to form a grating membrane, and allowing the grating membrane to rotate along with the mirror-face metal roller and be baked between the mirror-face metal roller and the first roller below the mirror-face metal roller;
(d) after step (c), curing the attached and baked grating membrane by the UV curing means and performing stripping, collecting and winding through the 2D/3D grating switch membrane collecting roller.

2. The roll-to-roll method for manufacturing a 2D/3D grating switch membrane according to claim 1, wherein the manufacturing device further comprises a stripping means, a first ion air knife means, a second ion air knife means and a suction hood.

3. The roll-to-roll method for manufacturing a 2D/3D grating switch membrane according to claim 2, wherein in step (a), after the concave grating is rubbed with the concave grating rubbing drum, static electricity and dust on the surface are removed by a charged ion airflow generated by the first ion air knife means, and electric ion air and dust are sucked by the suction hood.

4. The roll-to-roll method for manufacturing a 2D/3D grating switch membrane according to claim 2, wherein in step (b), the PI layer, after being rubbed with the PI rubbing means, is subjected to destaticizing and deducting treatment through the second air knife means.

5. The roll-to-roll method for manufacturing a 2D/3D grating switch membrane according to claim 2, wherein the stripping means comprises a stripping mechanism configured to strip the cured and shaped 2D/3D grating switch membrane from the mirror-face metal roller and a third ion air knife means configured to remove static electricity generated when the 2D/3D grating switch membrane is stripped and liquid crystal powder and dust remaining on the mirror-face metal roller during the stripping.

6. The roll-to-roll method for manufacturing a 2D/3D grating switch membrane according to claim 2, wherein a main shaft of the stripping means is connected with a main shaft of the mirror-face metal roller.

7. The roll-to-roll method for manufacturing a 2D/3D grating switch membrane according to claim 1, wherein the mirror-face metal roller is heated by an external heating device.

8. The roll-to-roll method for manufacturing a 2D/3D grating switch membrane according to claim 7, wherein the external heating device is an infrared heating device.

9. The roll-to-roll method for manufacturing a 2D/3D grating switch membrane according to claim 1, wherein the liquid crystal dropping means is driven by a screw rod, and a surface liquid crystal dropping width is adjusted by an infrared sensor.

10. The roll-to-roll method for manufacturing a 2D/3D grating switch membrane according to claim 9, wherein the liquid crystal dropping means keep warm through external heating, and a temperature of the liquid crystals is controlled between a melting point and a clearing point.

11. The roll-to-roll method for manufacturing a 2D/3D grating switch membrane according to claim 1, wherein the UV curing means comprises a precision light reflecting cover, a high-power UV curing lamp and a light collimating optical system; the high-power UV curing lamp is located below the mirror-face metal roller, the light collimating optical system is located between the mirror-face metal roller and the high-power curing lamp, and the precision light reflecting cover is located outside the high-power UV curing lamp.

12. The roll-to-roll method for manufacturing a 2D/3D grating switch membrane according to claim 1, wherein UV curing energy of the UV curing means is calculated according to the following formula:

$$E = E_0 \frac{L}{r_3 \omega_3}$$

where E represents UV curing energy of the liquid crystals in a unit area; $E_0$ represents radiation energy of the UV curing lamp in a unit area; L represents a radiation width of a UV lamp tube along a rotation direction of the mirror-face metal roller; $\omega_3$ represents an angular velocity of rotation of the mirror-face metal roller; $r_3$ represents a radius of the mirror-face metal roller.

13. The roll-to-roll method for manufacturing a 2D/3D grating switch membrane according to claim 1, wherein the gap d between the first roller and the mirror-face metal roller is greater than or equal to an overall thickness of the concave grating and ensures that grooves of the concave grating are filled up with the liquid crystals and that the concave grating is not crushed.

\* \* \* \* \*